US009918028B2

United States Patent
Higuchi

(10) Patent No.: US 9,918,028 B2
(45) Date of Patent: Mar. 13, 2018

(54) IMAGE CAPTURING APPARATUS COMPRISING A PLURALITY OF PROCESSING CIRCUITS FOR CORRECTING DEFECTIVE PIXEL BY USING INFORMATION OF DEFECTIVE PIXEL DETECTED IN DIFFERENT FRAMES AND CONTROL METHOD FOR THE SAME

(71) Applicant: CANON KABUSHIKI KAISHA, Tokyo (JP)

(72) Inventor: Daisuke Higuchi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/260,948

(22) Filed: Sep. 9, 2016

(65) Prior Publication Data
US 2017/0078600 A1 Mar. 16, 2017

(30) Foreign Application Priority Data
Sep. 10, 2015 (JP) ................................. 2015-178877

(51) Int. Cl.
*H04N 5/367* (2011.01)
*H04N 5/357* (2011.01)

(52) U.S. Cl.
CPC .......... *H04N 5/3675* (2013.01); *H04N 5/3575* (2013.01)

(58) Field of Classification Search
CPC ........................... H04N 5/3675; H04N 5/3575
See application file for complete search history.

(56) References Cited

U.S. PATENT DOCUMENTS 6,002,433 A    12/1999   Watanabe et al.
6,163,619 A * 12/2000   Maruo .................... G06T 7/001
                                                            382/141

(Continued)

FOREIGN PATENT DOCUMENTS

JP       07-059011 A     3/1995
JP    2009-267593 A   11/2009

OTHER PUBLICATIONS

U.S. Appl. No. 15/260,924, filed Sep. 9, 2016 "Image Processing Apparatus and Method, and Image Capturing Apparatus".

(Continued)

*Primary Examiner* — Roberto Velez
*Assistant Examiner* — Cynthia Segura
(74) *Attorney, Agent, or Firm* — Cowan, Liebowitz & Latman, P.C.

(57) ABSTRACT

An image capturing apparatus comprises: an image sensor which has a plurality of pixels; and a plurality of processing circuits which correct images of different frames output from the image sensor. Each processing circuit includes: a first detection circuit which performs defective pixel detection on a portion of a region of the plurality of pixels which is different from portions of the region on which the other processing circuits perform defective pixel detection; and a memory which stores information on defective pixels for the entire region obtained by combining information on defective pixels detected by the first detection circuit and information on defective pixels obtained by the other processing circuits. Further, each processing circuit corrects the image of each frame output from the image sensor, using the information on defective pixels for the entire region stored in the memory.

8 Claims, 10 Drawing Sheets

(56) References Cited

U.S. PATENT DOCUMENTS

| | | | |
|---|---|---|---|
| 6,642,960 B1 | 11/2003 | Kohashi et al. | |
| 6,683,643 B1* | 1/2004 | Takayama | H04N 5/367 348/247 |
| 6,724,945 B1 | 4/2004 | Yen et al. | |
| 7,061,533 B1* | 6/2006 | Urushiya | G01N 23/04 348/346 |
| 7,092,018 B1* | 8/2006 | Watanabe | G06T 7/0002 257/E27.151 |
| 7,433,547 B2* | 10/2008 | Yamamoto | H04N 5/367 345/427 |
| 7,511,748 B2 | 3/2009 | Kagle et al. | |
| 7,551,204 B2* | 6/2009 | Muraki | H04N 9/045 348/222.1 |
| 7,649,555 B2 | 1/2010 | Noh | |
| 7,746,392 B2 | 6/2010 | Hayaishi | |
| 8,013,914 B2 | 9/2011 | Egawa | |
| 8,054,348 B2 | 11/2011 | Mori | |
| 8,089,537 B2 | 1/2012 | Hoshuyama et al. | |
| 8,259,198 B2 | 9/2012 | Cote et al. | |
| 8,310,570 B1 | 11/2012 | Aldrich et al. | |
| 8,451,351 B2* | 5/2013 | Kitani | H04N 5/2355 348/246 |
| 8,797,428 B2 | 8/2014 | Ishiga | |
| 8,854,511 B2 | 10/2014 | Kawai et al. | |
| 8,891,866 B2* | 11/2014 | Shinozaki | G06T 5/00 382/167 |
| 9,041,854 B2 | 5/2015 | Kiyosawa et al. | |
| 9,197,871 B2 | 11/2015 | Shoyama | |
| 9,635,292 B2 | 4/2017 | Furuya | |
| 9,693,000 B2 | 6/2017 | Furuya | |
| 2003/0043286 A1* | 3/2003 | Kato | H04N 5/3675 348/246 |
| 2004/0032516 A1 | 2/2004 | Kakarala | |
| 2004/0212705 A1 | 10/2004 | Hsieh | |
| 2005/0219390 A1* | 10/2005 | Tajima | H04N 9/045 348/246 |
| 2005/0231617 A1* | 10/2005 | Kitani | H04N 5/3675 348/246 |
| 2005/0253947 A1* | 11/2005 | Kim | H04N 5/361 348/308 |
| 2006/0050158 A1* | 3/2006 | Irie | H04N 5/2252 348/246 |
| 2006/0092477 A1* | 5/2006 | Okado | H04N 1/409 358/448 |
| 2006/0233439 A1* | 10/2006 | Zhao | H04N 9/045 382/168 |
| 2007/0229676 A1* | 10/2007 | Tanaka | H04N 9/643 348/223.1 |
| 2008/0074491 A1* | 3/2008 | Matsui | A61B 1/00016 348/65 |
| 2008/0117318 A1* | 5/2008 | Aoki | H04N 5/367 348/246 |
| 2008/0231734 A1* | 9/2008 | Enomoto | H04N 1/401 348/246 |
| 2008/0273101 A1 | 11/2008 | Takenaka et al. | |
| 2008/0273102 A1 | 11/2008 | Hyakutake et al. | |
| 2008/0316336 A1 | 12/2008 | Oshima | |
| 2009/0079853 A1 | 3/2009 | Hoshuyama et al. | |
| 2009/0237532 A1 | 9/2009 | Mori | |
| 2010/0026862 A1 | 2/2010 | Nishiwaki | |
| 2010/0066872 A1* | 3/2010 | Yamaguchi | H04N 5/367 348/246 |
| 2010/0079629 A1 | 4/2010 | Park et al. | |
| 2011/0032393 A1* | 2/2011 | Yamaguchi | H04N 5/367 348/247 |
| 2011/0080505 A1 | 4/2011 | Ogino | |
| 2011/0102649 A1 | 5/2011 | Hashizume | |
| 2011/0234842 A1 | 9/2011 | Ishiga | |
| 2012/0020541 A1* | 1/2012 | Hayashida | A61B 6/583 382/132 |
| 2012/0281123 A1 | 11/2012 | Hoda et al. | |
| 2013/0027594 A1* | 1/2013 | Krymski | H04N 5/378 348/300 |
| 2013/0128082 A1 | 5/2013 | Kiyosawa et al. | |
| 2013/0208974 A1 | 8/2013 | Nakano et al. | |
| 2014/0016005 A1* | 1/2014 | Kishima | H04N 5/367 348/246 |
| 2014/0125847 A1* | 5/2014 | Yasuda | H04N 5/367 348/242 |
| 2015/0070536 A1* | 3/2015 | Sasaki | H04N 5/367 348/246 |
| 2015/0116566 A1 | 4/2015 | Yamamoto | |
| 2015/0156405 A1* | 6/2015 | Izawa | G02B 7/34 348/246 |
| 2015/0181148 A1* | 6/2015 | Slovick | H04N 5/378 348/231.99 |
| 2015/0244953 A1 | 8/2015 | Furuya | |
| 2015/0244956 A1 | 8/2015 | Furuya | |
| 2016/0006960 A1* | 1/2016 | Takahashi | H04N 5/367 348/246 |
| 2016/0127667 A1* | 5/2016 | Lin | H04N 5/3675 348/246 |
| 2017/0053577 A1* | 2/2017 | Cao | G09G 3/006 |
| 2017/0070692 A1* | 3/2017 | Lin | H04N 5/3675 |
| 2017/0078599 A1* | 3/2017 | Higuchi | H04N 5/367 |
| 2017/0148141 A1* | 5/2017 | Lin | G06T 5/002 |
| 2017/0230634 A1* | 8/2017 | Takenouchi | H04N 13/0018 |
| 2017/0318244 A1* | 11/2017 | Koskinen | H04N 9/045 |

OTHER PUBLICATIONS

U.S. Notice of Allowance dated Aug. 4, 2017, that issued in the related U.S. Appl. No. 15/260,924.

* cited by examiner

FIG. 3

| R | Gr | R | Gr |
|---|----|---|----|
| Gb | B | Gb | B |
| R | Gr | R | Gr |
| Gb | B | Gb | B |

FIG. 4A

| B | Gb | B | Gb | B | Gb | B |
|---|----|---|----|---|----|---|
| Gr | R11 | Gr | R12 | Gr | R13 | Gr |
| B | Gb | B | Gb | B | Gb | B |
| Gr | R21 | Gr | R22 | Gr | R23 | Gr |
| B | Gb | B | Gb | B | Gb | B |
| Gr | R31 | Gr | R32 | Gr | R33 | Gr |
| B | Gb | B | Gb | B | Gb | B |

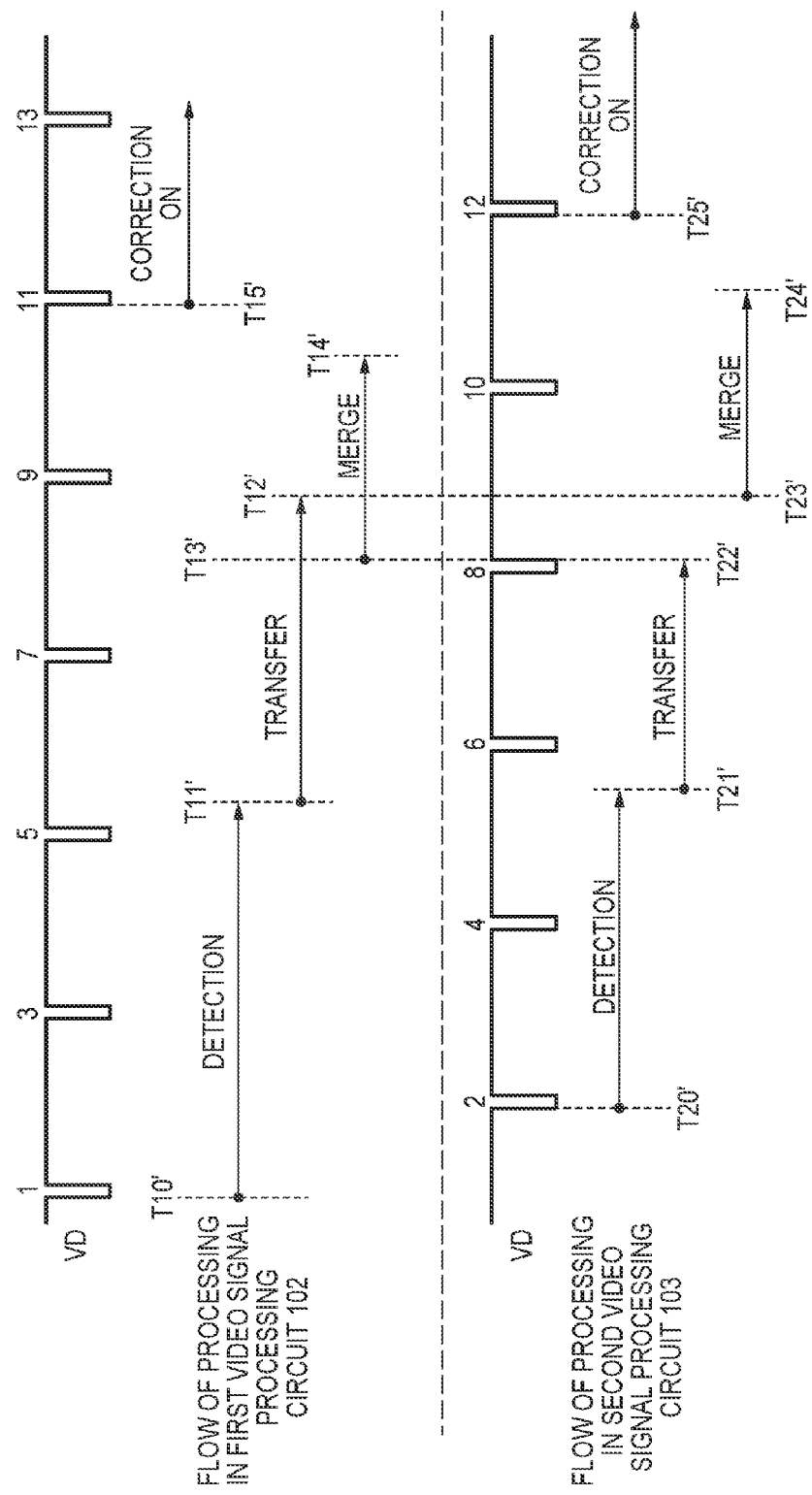

IMAGE CAPTURING APPARATUS COMPRISING A PLURALITY OF PROCESSING CIRCUITS FOR CORRECTING DEFECTIVE PIXEL BY USING INFORMATION OF DEFECTIVE PIXEL DETECTED IN DIFFERENT FRAMES AND CONTROL METHOD FOR THE SAME

BACKGROUND OF THE INVENTION

Field of the Invention

The present invention relates to an image capturing apparatus and a control method for the same.

Description of the Related Art

In recent years, television standards have been changing from a resolution of 1920 horizontal pixels by 1080 vertical pixels (1920×1080 pixels) called full high definition to a resolution of 3840×2160 pixels called 4 k2 k, which is four times the pixel number of HD. Moreover, as a next generation standard after 4 k2 k, there is also a standard called 8 k4 k or super high definition, and according to this standard, the pixel number is as much as 7680×4320 pixels.

On the other hand, with the increase in the pixel number, the total number of defective pixels in CMOS sensors has also been increasing. In general, in order to correct signals of defective pixels, defective pixel information is stored in the memory of the camera body, and signals of the defective pixels are corrected using this data at the time of shooting. However, the memory capable of storing the defective pixel information is limited, and in the case where a large number of defective pixels exist, the information for all of the defective pixels cannot be stored in the memory.

Also, it takes a long time to perform processing for detecting defective pixels on all the pixels, and thus in terms of product operations, a detection method needs to be devised so as to suppress the processing time to a level that does not make the user feel uncomfortable.

Japanese Patent Laid-Open No. 2009-267593 discloses a method for reducing the processing time, by dividing a defective pixel inspection target region into a plurality of regions, and performing defective pixel detection only on divided regions that are selected.

However, with the method described in Japanese Patent Laid-Open No. 2009-267593, there is a problem in that the processing time cannot be reduced in the case where all the divided regions are selected.

SUMMARY OF THE INVENTION

The present invention has been made in consideration of the above situation, and reduces the required processing time, in the case of performing defective pixel detection processing on all pixels.

According to the present invention, provided is an image capturing apparatus comprising: an image sensor which has a plurality of pixels; and a plurality of processing circuits which correct images of different frames that are output from the image sensor, wherein each of the plurality of processing circuits includes: a first detection circuit which performs defective pixel detection on a portion of a region of the plurality of pixels which is different from portions of the region on which the other processing circuits perform defective pixel detection; and a memory which stores information on defective pixels for the entire region obtained by combining information on defective pixels detected by the first detection circuit and information on defective pixels obtained by the other processing circuits, and wherein each of the plurality of processing circuits corrects the image of each frame output from the image sensor, using the information on defective pixels for the entire region stored in the memory.

Further, according to the present invention, provided is a control method for an image capturing apparatus including a plurality of processing circuits which correct images of different frames that are output from an image sensor which has a plurality of pixels, the method comprising: performing, in each processing circuit, defective pixel detection on a portion of a region of the plurality of pixels which is different from portions of the region on which the other processing circuits perform defective pixel detection; and storing, in a memory of each processing circuit, information on defective pixels for the entire region obtained by combining information on defective pixels detected in the defective pixel detection and information on defective pixels obtained by the other processing circuits, and correcting, with each of the plurality of processing circuits, the image of each frame output from the image sensor, using the information on defective pixels for the entire region stored in the memory.

Furthermore, according to the present invention, provided is a computer-readable storage medium which stores a program for causing a computer provided in an image capturing apparatus including an image sensor which has a plurality of pixels, to function as a plurality of processing circuits which correct images of different frames that are output from the image sensor, wherein each of the plurality of processing circuits functions as: a first detection circuit which performs defective pixel detection on a portion of a region of the plurality of pixels which is different from portions of the region on which the other processing circuits perform defective pixel detection; and a memory which stores information on defective pixels for the entire region obtained by combining information on defective pixels detected by the first detection circuit and information on defective pixels obtained by the other processing circuits, and wherein each of the plurality of processing circuits corrects the image of each frame output from the image sensor, using the information on defective pixels for the entire region stored in the memory.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 3 is a diagram showing an example of a pixel configuration according to the embodiments;

FIGS. 4A and 4B are diagrams illustrating a first defective pixel detection method according to a first embodiment;

FIG. 11 is a time chart of defective pixel detection processing according to the second embodiment.

DESCRIPTION OF THE EMBODIMENTS

Exemplary embodiments of the present invention will be described in detail in accordance with the accompanying drawings.

First Embodiment

Figure 1:
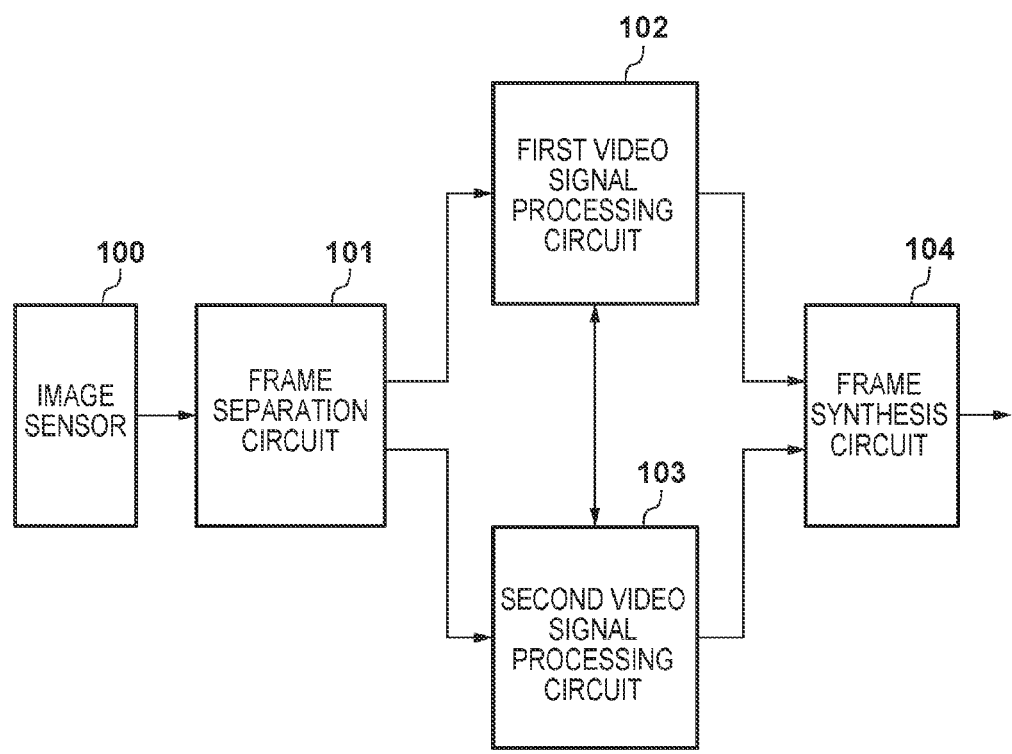
FIG. 1 is a block diagram showing a system configuration of an image capturing apparatus according to embodiments of the present invention.

FIG. 1 is a block diagram showing a schematic configuration of an image capturing apparatus according to embodiments of the present invention. In FIG. 1, an image sensor 100 is a CMOS image sensor, and has a plurality of pixels covered with color filters in a Bayer array. Some of the pixels of the image sensor 100 are affected by variation in the device manufacturing process, degradation over time and the like, and become defective pixels whose output does not take a desired value.

A frame separation circuit 101 separates video signals from the image sensor 100 into video signals of odd number frames and video signals of even number frames, and outputs those signals to downstream circuits. The video signals of the odd number frames are output to a first video signal processing circuit 102 to be described later, and the video signals of the even number frames are output to a second video signal processing circuit 103. In the case where the amount of video image data that can be processed by the video signal processing circuits is limited, it becomes possible to reduce a processing load by separating the frames, and to achieve video signal processing at a high-speed frame rate.

The first video signal processing circuit 102 processes the video signals from the frame separation circuit 101, and outputs the processed video signals to a frame synthesis circuit 104. The second video signal processing circuit 103 processes the video signals from the frame separation circuit 101, and outputs the processed video signals to the frame synthesis circuit 104. The first video signal processing circuit 102 and the second video signal processing circuit 103 have a communication port for sharing internal data. The internal configuration of the first video signal processing circuit 102 and the second video signal processing circuit 103 will be described later.

The frame synthesis circuit 104 combines the video signal of the odd number frames from the first video signal processing circuit 102 and the video signal of the even number frames from the second video signal processing circuit 103, and generates and outputs one video signal.

In this manner, video signals are processed by two video signal processing circuits, namely, the first video signal processing circuit 102 and the second video signal processing circuit 103, whereby even in the case where the image sensor 100 has a large pixel number, the video signals output from the image sensor 100 can be processed at a high speed.

Figure 2:
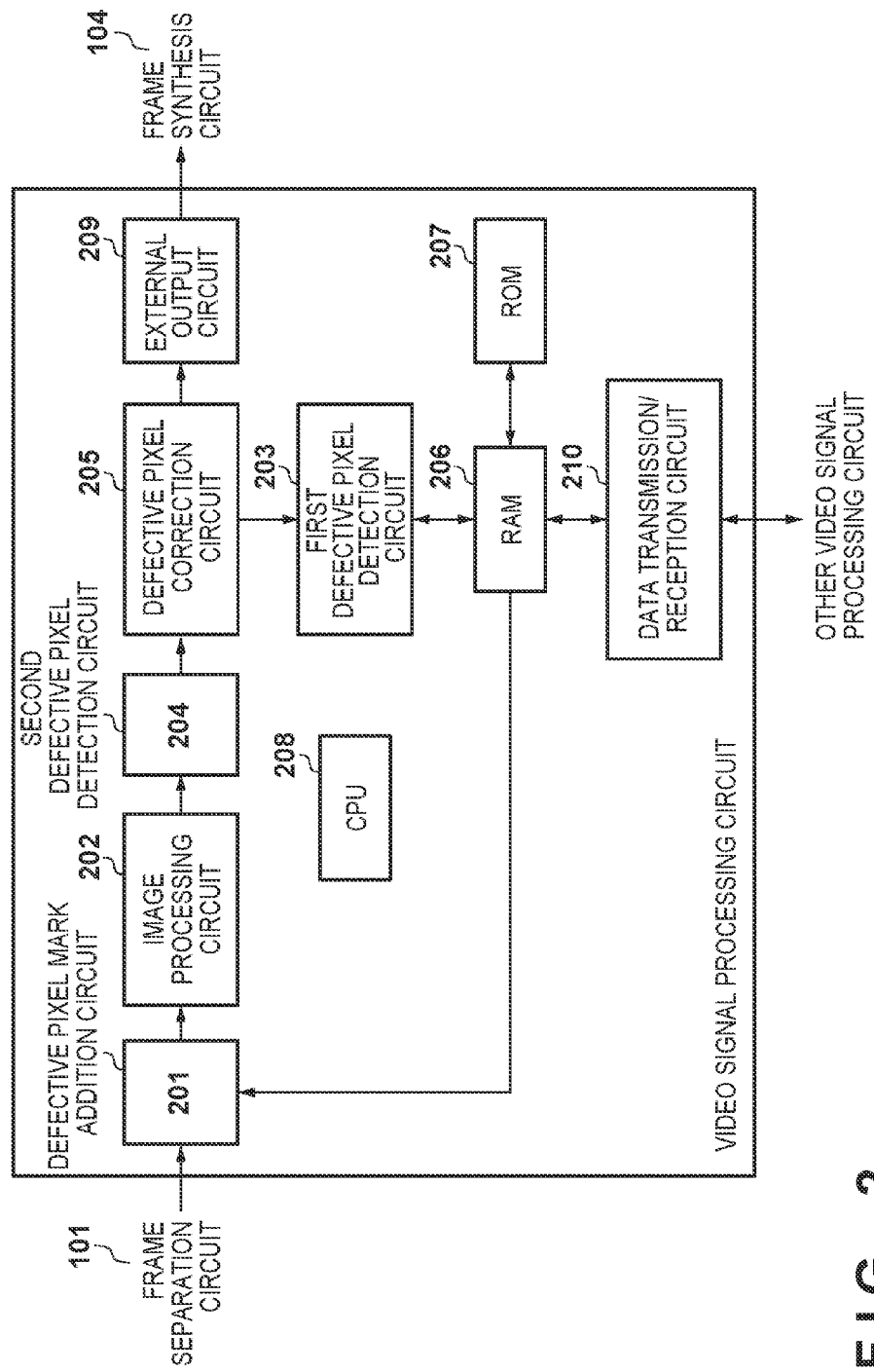
FIG. 2 is a block diagram showing an internal configuration of a video signal processing circuit according to the embodiments.

FIG. 2 is a diagram showing the internal configuration of the first video signal processing circuit 102 and the second video signal processing circuit 103. The first video signal processing circuit 102 and the second video signal processing circuit 103 have similar configurations, thus will be collectively described with reference to FIG. 2, and are simply called "video signal processing circuits" here, with "first" and "second" omitted.

In FIG. 2, a defective pixel mark addition circuit 201 is a circuit for adding a defective pixel mark to a pixel at an address at which correction is to be performed, among video signals that have been input from the frame separation circuit 101. Note that this address is acquired by reading defective pixel data that was detected by a first defective pixel detection circuit 203 by processing that will be described later and stored in an RAM 206. An image processing circuit 202 performs processing such as correction of offset variation and gain variation of images.

A second defective pixel detection circuit 204 performs defective pixel detection on image data that has been input, by a second defective pixel detection method, and sends defective pixel data such as the address and characteristic data to a defective pixel correction circuit 205. When performing defective pixel detection by the second defective pixel detection circuit 204, the image sensor 100 is exposed, and the detection is performed on images obtained by normal shooting one image at a time, instead of performing the detection under a specific environment as in the case of the first defective pixel detection circuit 203 to be described later.

The defective pixel correction circuit 205 corrects the image data of pixels having a defective pixel mark added by the defective pixel mark addition circuit 201, and the image data of pixels detected by the second defective pixel detection circuit 204, using the image data of the surrounding pixels. In the case where, however, the surrounding pixels include defective pixels, correction is performed using pixels other than those pixels. Note that regarding the defective pixel correction method, a known method can be used, and thus detailed description is omitted here. An external output circuit 209 performs necessary calculations on the image that underwent defective pixel correction by the defective pixel correction circuit 205, and after that, outputs the image to the frame synthesis circuit 104.

Meanwhile, the first defective pixel detection circuit 203 performs defective pixel detection on image data that has been input, by a first defective pixel detection method that will be described later, and stores defective pixel data including the address and characteristic data in the RAM 206. When defective pixel detection is performed in the first defective pixel detection circuit 203, shooting and signal processing are performed in a specific environment such as an environment in which the lens is shielded from light and a gain is increased, or an environment in which illumination light having a uniform luminance level is irradiated, such that defective pixels are easily identified. Note that in the case where defective pixel detection is performed in the first defective pixel detection circuit 203, it is not necessary to perform defective pixel mark addition by the defective pixel mark addition circuit 201, defective pixel detection by the second defective pixel detection circuit 204 and defective pixel correction by the defective pixel correction circuit 205. In the case where such processing is performed, defective pixels other than previously detected defective pixels can be detected, and in the case where such processing is not performed, currently occurring defective pixels including previously detected defective pixels can be detected, either of which can be selected. Moreover, defective pixel detection by the first defective pixel detection circuit 203 is performed in cases such as where an instruction is given by the user via an operation unit (not illustrated), where an instruction is automatically given every time a predetermined use time has elapsed, and so on.

The RAM 206 stores defective pixel data obtained by the first defective pixel detection circuit 203. The defective pixel data placed in the RAM 206 is copied and stored in a ROM 207. A CPU 208 performs calculations on the data in the RAM 206, and controls the other circuits. A data transmission/reception circuit 210 is a circuit for transmitting and receiving the data stored in the RAM 206 between the first video signal processing circuit 102 and the second video signal processing circuit 103.

FIG. 3 is a diagram showing an example of the pixel configuration of the image sensor 100. The image sensor 100 is constituted by pixels having color filters in a Bayer array, and three types of color filters of R, G and B are used. In FIG. 3, the color filters of G pixels in the same row as R pixels are written as Gr, and the color filters of G pixels in the same row as B pixels are written as Gb, but function as color filters having the same characteristics. Also, FIG. 3 shows only a portion of pixels (4×4 pixels), but there are, in actually, 4096×2160 pixels, for example, arranged in the same manner.

Figure 4B:
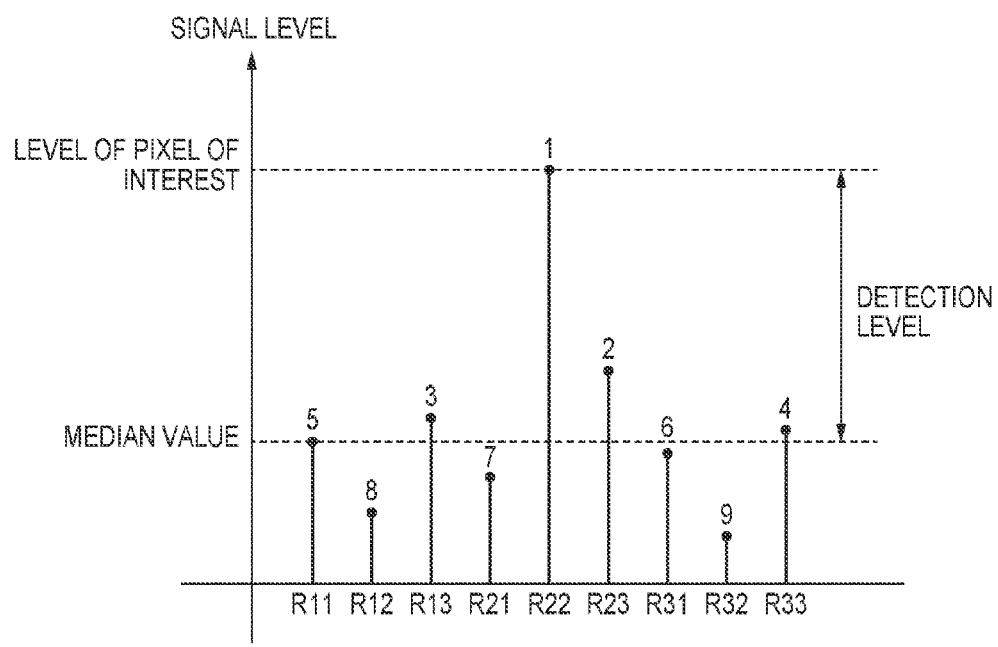

Next, the first defective pixel detection method performed by the first defective pixel detection circuit 203 will be described with reference to FIGS. 4A and 4B. In FIG. 4A, reference numeral R22 denotes a pixel of interest targeted for defective pixel detection, and reference numerals R11, R12, R13, R21, R23, R31, R32 and R33 denote pixels that have the same color as the pixel of interest and are adjacent to the pixel of interest. The first defective pixel detection circuit 203 refers to these 3×3 pixels having the same color at the time of defective pixel detection. Here, the R pixels are used as an example, but regarding the Gr, Gb and B pixels, detection is performed by a similar method.

FIG. 4B is a diagram showing an example in which the abscissa indicates information specifying pixels, and the ordinate indicates the pixel signal level. Also, numerical values displayed in the upper part of the bar graph in FIG. 4B indicate the order of the respective magnitudes of the signal levels of the 3×3 pixels. The first defective pixel detection circuit 203 acquires the signal level of a pixel of interest denoted by R22. Next, among the nine pixels, for example, a pixel (in this example, R11) having an intermediate signal level such as a median value is selected, and the signal level is acquired. Note that the acquired signal level will be described as a median value below. As described above, when the first defective pixel detection circuit 203 performs defective pixel detection, in the case where the pixel of interest R22 is not a defective pixel, the difference from the median value is predicted to be small. In view of this, the difference (detection level) between the signal level of the pixel of interest and the median value is compared to a threshold value for determining a defective pixel, and in the case where the detection level is greater than the threshold value, the pixel of interest is determined as a defective pixel.

Figure 5:
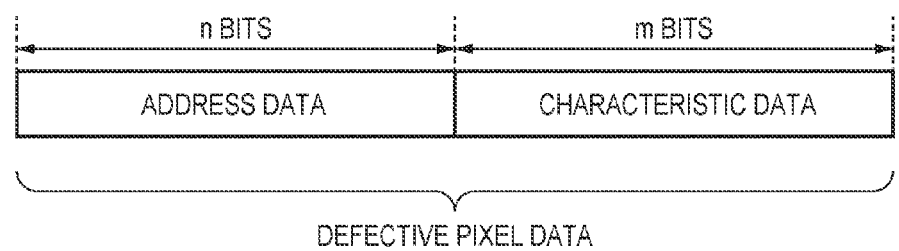
FIG. 5 is a diagram showing an example of defective pixel data according to the embodiments.

FIG. 5 shows the format of the defective pixel data of a defective pixel detected by the first defective pixel detection circuit 203. The (n+m) bits of the defective pixel data represent one defective pixel. The upper-order n bits represent the address data of the defective pixel, and indicate where on the surface of the image the defective pixel exists. The address data may be represented by an absolute address expressed by an (H, V) address, or may be represented by a relative address obtained by relatively counting the number of pixels from the top left of the screen or immediately preceding data. The lower-order m bits represent the characteristic data of the defective pixel, and indicate the type of the defective pixel and the level of the defective pixel.

Figure 6:
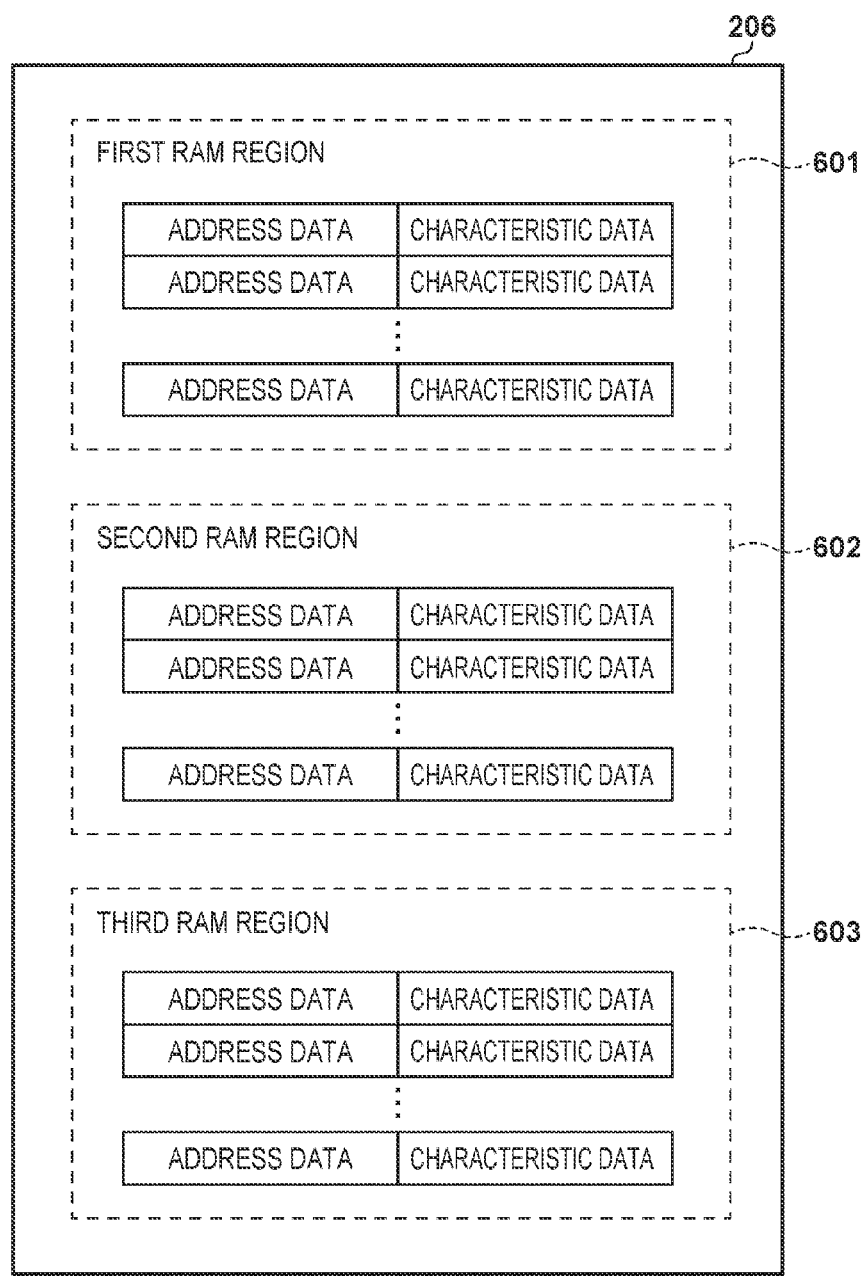
FIG. 6 is a diagram illustrating defective pixel data stored in an RAM according to the embodiments.

FIG. 6 is a diagram illustrating defective pixel data stored in the RAM 206. The RAM 206 has three regions, namely, a first RAM region 601, a second RAM region 602 and a third RAM region 603. The first RAM region 601 stores the defective pixel data of an upper portion of the image. The second RAM region 602 stores the defective pixel data of a lower portion of the image. The third RAM region 603 stores the defective pixel data of the entire region of the image.

In the case where the above two video signal processing circuits, namely, the first video signal processing circuit 102 and the second video signal processing circuit 103 independently perform defective pixel detection, shared defective pixel data cannot be obtained. Moreover, in the case where one of the two video signal processing circuits, namely, the first defective pixel detection circuit 203 performs defective pixel detection, it takes a longer time to perform the processing because time for transferring obtained defective pixel data to the other video signal processing circuit is required, in addition to time required for defective pixel detection. In view of this, in this first embodiment, the first video signal processing circuit 102 and the second video signal processing circuit 103 perform defective pixel detection on video signals of different regions of an image, and transfer acquired data to the other video signal processing circuit.

Figure 7:
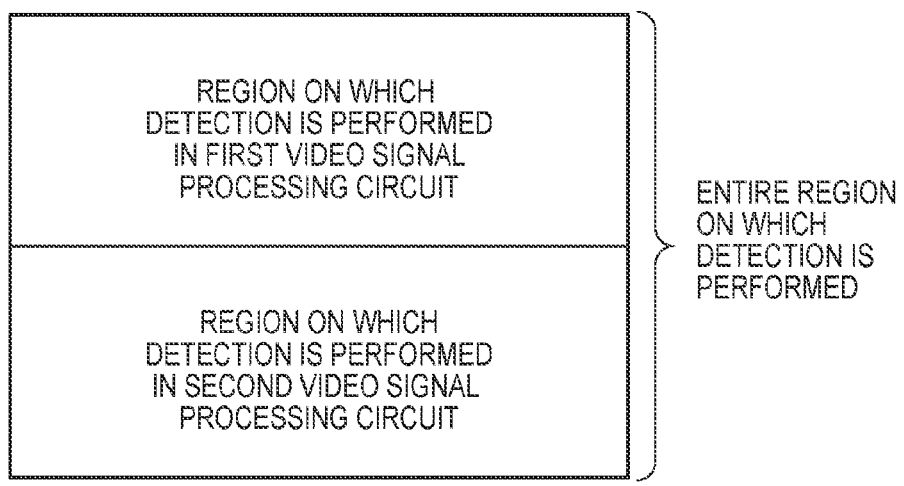
FIG. 7 is a diagram showing a region targeted for defective pixel detection according to a first embodiment.

FIG. 7 shows regions targeted for defective pixel detection in the first video signal processing circuit 102 and the second video signal processing circuit 103. In the first video signal processing circuit 102, defective pixel detection is performed on the upper region of the image vertically divided into two, using the first defective pixel detection circuit 203. In the second video signal processing circuit 103, defective pixel detection is performed on the lower region of the image using the first defective pixel detection circuit 203. Note that the size (number of lines) of the region that undergoes detection in the first video signal processing circuit 102 and the size of the region that undergoes detection in the second video signal processing circuit 103 are substantially equivalent.

Figure 8:
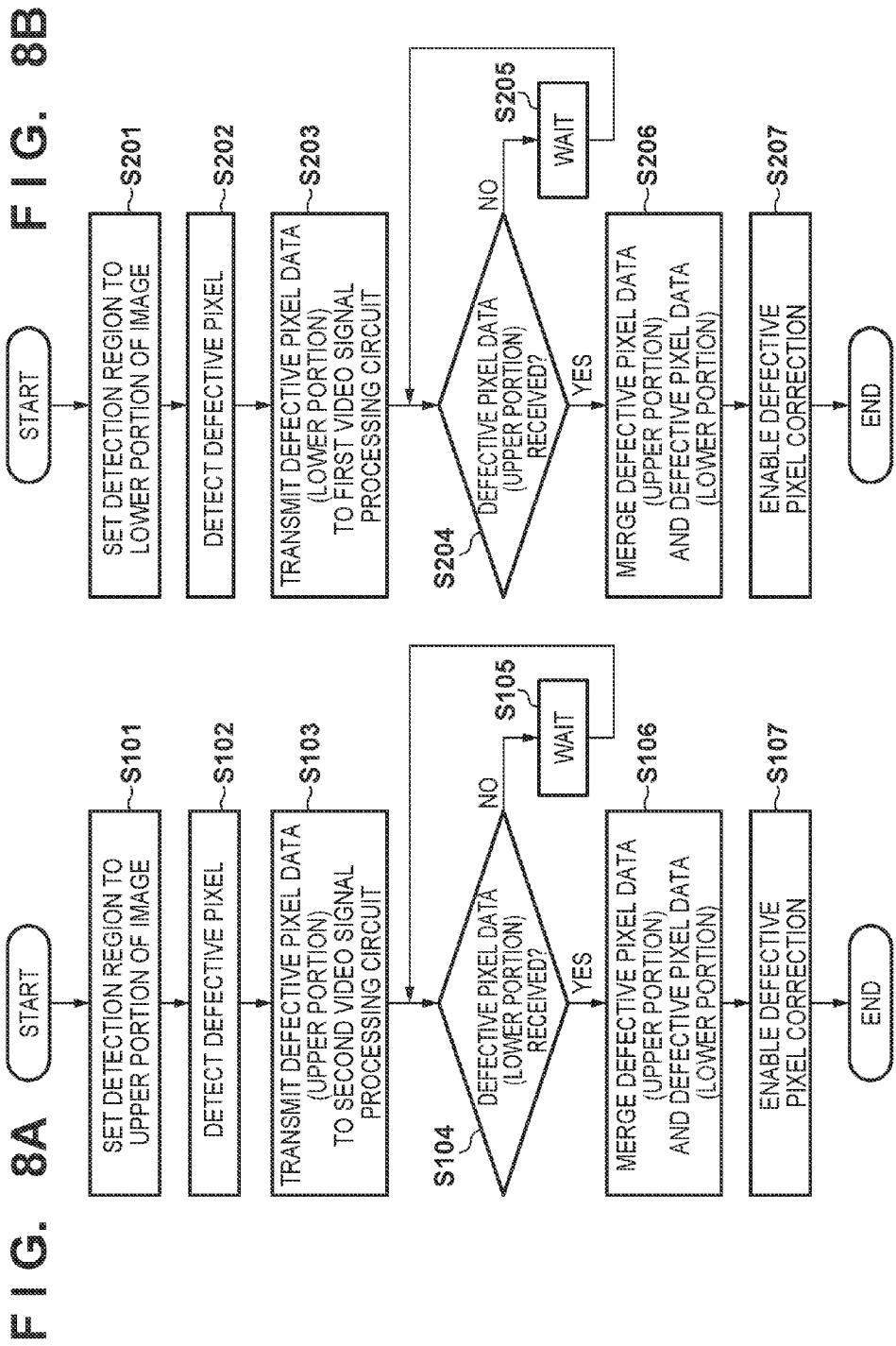
FIGS. 8A and 8B are flowcharts of defective pixel detection processing according to the first embodiment.

FIG. 8A is a flowchart of defective pixel detection processing performed by the first defective pixel detection circuit 203 of the first video signal processing circuit 102. In step S101, a detection region for a defective pixel is set to the upper portion of the image. Next, in step S102, the first defective pixel detection circuit 203 performs defective pixel detection, by sequentially performing the processing described above with reference to FIGS. 4A and 4B on each of the pixels within the detection region set in step S101. The detected defective pixel data (upper portion) is stored in the first RAM region 601 of the RAM 206.

In step S103, the defective pixel data (upper portion) detected in step S102 is transmitted to the second video signal processing circuit 103 by the data transmission/reception circuit 210. In step S104, it is determined whether or not defective pixel data (lower portion) detected in the second video signal processing circuit 103 has been received. In the case where defective pixel data has not been received, the procedure advances to step S105, and when a predetermined time has elapsed, the procedure advances to step S104 again. In the case where it is determined in step S104 that defective pixel data (lower portion) has been received, the procedure advances to step S106.

In step S106, the defective pixel data (upper portion) and the defective pixel data (lower portion) are merged. The received defective pixel data (lower portion) is stored in the second RAM region 602 of the RAM 206 via the data transmission/reception circuit 210, and is merged with the defective pixel data (upper portion) detected in step S102, whereby defective pixel data (entire region) for the entire region of the image is generated. The generated defective pixel data (entire region) is stored in the third RAM region 603 of the RAM 206.

In step S107, defective pixel correction in the first video signal processing circuit 102 is enabled, using the defective pixel data (entire region) generated in step S106.

FIG. 8B is a flowchart of defective pixel detection processing performed by the first defective pixel detection circuit 203 of the second video signal processing circuit 103. In step S201, a detection region for a defective pixel is set to the lower portion of the image. Next, in step S202, the first defective pixel detection circuit 203 performs defective pixel detection by sequentially performing the processing described above with reference to FIGS. 4A and 4B on each of the pixels within the detection region set in step S201. The detected defective pixel data (lower portion) is stored in the second RAM region 602 of the RAM 206.

In step S203, the defective pixel data (lower portion) detected in step S202 is transmitted to the first video signal processing circuit 102 by the data transmission/reception circuit 210. In step S204, it is determined whether or not defective pixel data (upper portion) detected in the first video signal processing circuit 102 has been received. In the case where defective pixel data has not been received, the procedure advances to step S205, and when a predetermined time has elapsed, the procedure advances to step S204 again. In the case where it is determined in step S204 that defective pixel data (upper portion) has been received, the procedure advances to step S206.

In step S206, the defective pixel data (upper portion) and the defective pixel data (lower portion) are merged. The received defective pixel data (upper portion) is stored in the first RAM region 601 of the RAM 206 via the data transmission/reception circuit 210, and is merged with the defective pixel data (lower portion) detected in step S202, whereby defective pixel data (entire region) for the entire region of the image is generated. The generated defective pixel data (entire region) is stored in the third RAM region 603 of the RAM 206.

In step S207, defective pixel correction in the second video signal processing circuit 103 is enabled, using the defective pixel data (entire region) generated instep S206.

Figure 9:
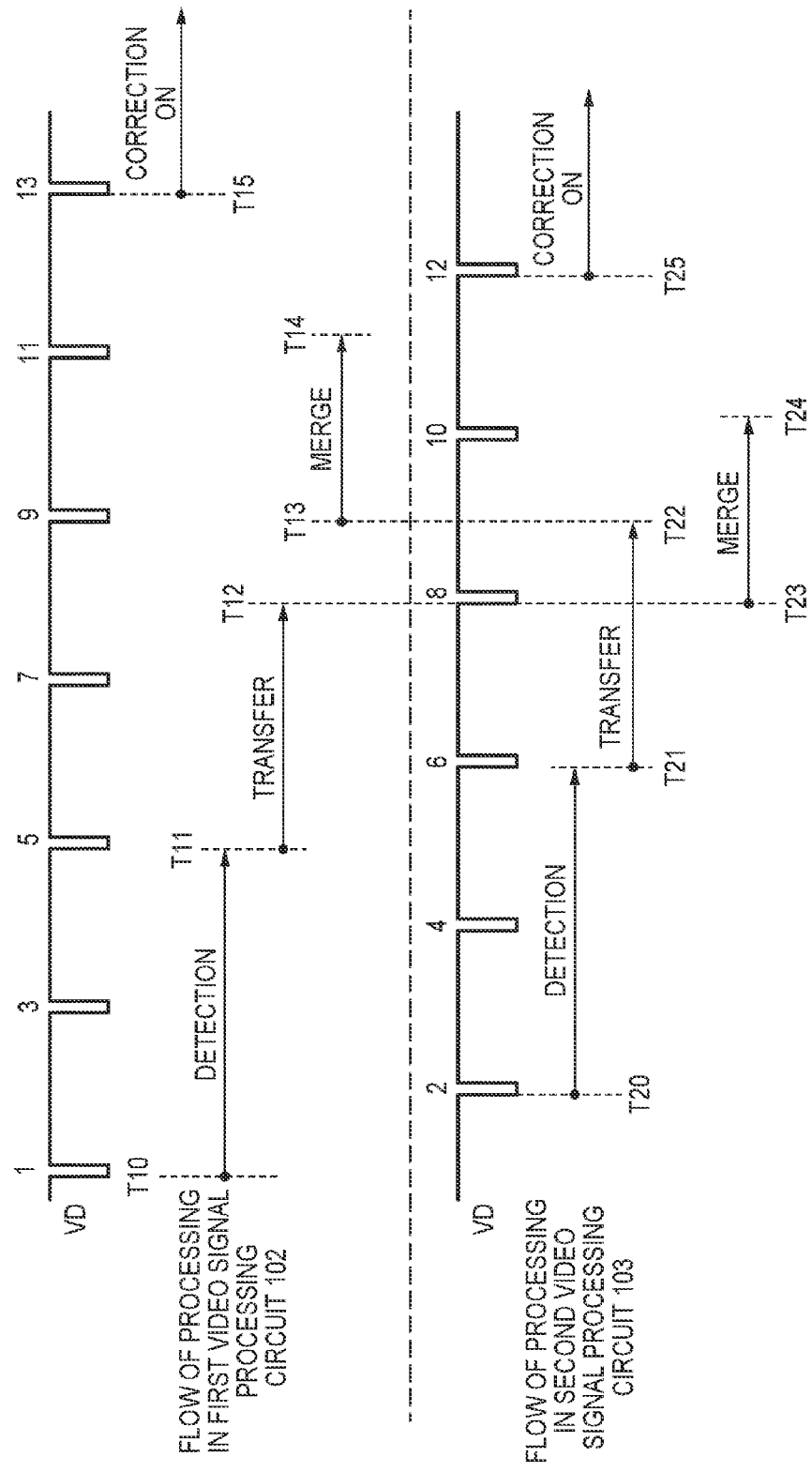
FIG. 9 is a time chart of defective pixel detection processing according to the first embodiment.

Next, the relationship on the time axis between defective pixel detection processing performed in the first video signal processing circuit 102 and defective pixel detection processing performed in the second video signal processing circuit 103 will be described with reference to FIG. 9. The abscissa in FIG. 9 is a time axis, with a flow of the defective pixel detection processing in the first video signal processing circuit 102 being shown in the upper portion of the figure, and a flow of the defective pixel detection processing in the second video signal processing circuit 103 being shown in the lower portion of the figure.

The defective pixel detection (step S102 in FIG. 8A) in the first video signal processing circuit 102 starts at T10 and ends at T11. The defective pixel data transfer (step S103 in FIG. 8A) from the first video signal processing circuit 102 to the second video signal processing circuit 103 starts at T11 and ends at T12.

Next, in the first video signal processing circuit 102, the merging (step S106 in FIG. 8A) of the defective pixel data (upper portion) and the defective pixel data (lower portion) starts at T13 and ends at T14. Defective pixel correction can then be started at T15 using the defective pixel data (entire region) in the first video signal processing circuit 102.

Meanwhile, the defective pixel detection (step S202 in FIG. 8B) in the second video signal processing circuit 103 starts at T20 and ends at T21. The defective pixel data transfer (step S203 in FIG. 8B) from the second video signal processing circuit 103 to the first video signal processing circuit 102 starts at T21 and ends at T22.

Next, in the second video signal processing circuit 103, the merging (step S206 in FIG. 8B) of the defective pixel data (upper portion) and the defective pixel data (lower portion) starts at T23 and ends at T24. In the second video signal processing circuit 103, defective pixel correction can then be started at T25 using the defective pixel data (entire region).

As shown in FIG. 9, the merging (step S106 in FIG. 8A) of the defective pixel data in the first video signal processing circuit 102 starts at the timing at which the transfer (step S203 in FIG. 8B) of the defective pixel data from the second video signal processing circuit 103 ends, and thus T13=T22.

Moreover, the merging (step S206 in FIG. 8B) of the defective pixel data in the second video signal processing circuit 103 starts at a timing when the transfer (step S103 in FIG. 8A) of the defective pixel data from the first video signal processing circuit 102 ends, and thus T23=T12.

Moreover, as shown in FIG. 7, the region processed by the first video signal processing circuit 102 and the region processed by the second video signal processing circuit 103 are substantially equivalent, thus times required for the respective processing are also substantially equivalent, and the following relationships hold true.

$$T11-T10=T21-T20$$

$$T12-T11=T22-T21$$

$$T14-T13=T24-T23$$

Here, when the respective processing is considered based on VD, it is assumed that in each circuit, a time (T11−T10) required for detection is 2 VD, a time (T12−T11) required for transfer is 1.5 VD, and a time (T14−T13) required for merging is 1.2 VD. At this time, a timing (T15) when defective pixel correction can be started is, in the first video signal processing circuit 102, 6 VD after the processing started at T10, and in the second video signal processing circuit 103, 5.5 VD. In terms of frame number, correction can be performed from the 12th frame.

On the other hand, in the case of performing substantially equivalent processing by a conventional method, in which defective pixels are detected from the entire region with one circuit and data is then transferred, first, the time required for the detection doubles to 4 VD, and the time required for the transfer also doubles to 3 VD. Therefore, 7 VD will be required before defective pixel correction can be started in both of the two circuits. In terms of frame number, correction can only be performed from the 15th frame.

As described above, according to this first embodiment, by using a method for dividing the region and performing defective pixel detection with a plurality of circuits, it becomes possible to reduce the processing time compared with a conventional method.

Note that the times for the respective processing shown in FIG. 9 are merely an example, and the time required for the processing is not limited to the time shown in the example. The longer the time required for defective pixel detection, the greater the time reducing effect when the processing is divided.

Moreover, in the first embodiment, the processing is divided between two circuits, but the processing may be divided between two or more circuits. This makes it possible to further reduce the processing time.

In addition, in the first embodiment, the detection region is vertically divided into two, but a dividing method is not limited thereto. An appropriate division method may be used based on a method for reading out pixel data from the image sensor 100, or the order of storing defective pixel data. In this embodiment, a method that vertically divides the pixels of the image sensor 100 was described as an example, assuming that the pixels are read in the horizontal direction from the top left, and that the defective pixel data is also stored in the RAM 206 in the same order. With such a configuration, when merging two types of data, namely, defective pixel data for only the upper portion and defective pixel data for only the lower portion, data rearrangement or the like does not arise, and thus merge processing is simplified, and the processing time can be reduced.

Second Embodiment

A second embodiment will be described below with reference to FIGS. 10 and 11. Note that the configuration of the image capturing apparatus, the defective pixel detection method and the like are similar to the above-described first embodiment, and description thereof is omitted.

Figure 10:
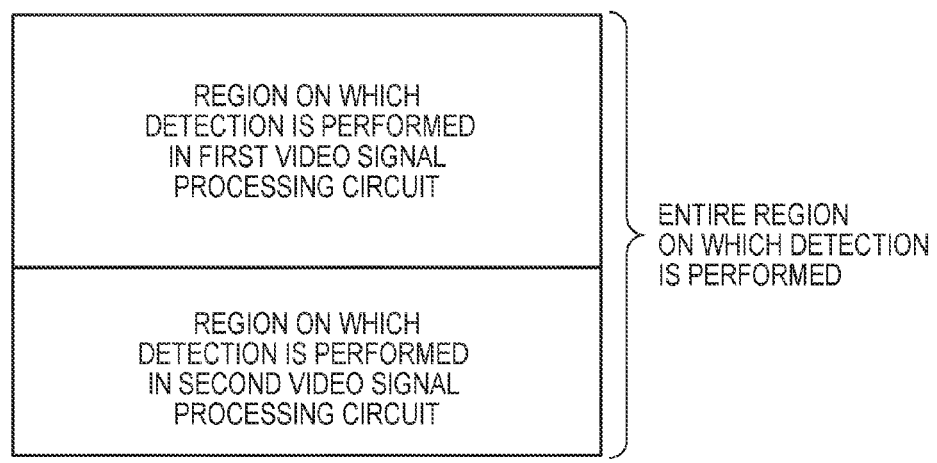
FIG. 10 is a diagram showing a region targeted for defective pixel detection according to a second embodiment.

FIG. 10 shows a region targeted for defective pixel detection in the first video signal processing circuit 102 and the second video signal processing circuit 103. In the first video signal processing circuit 102, defective pixel detection is performed on the upper region of the image by the first defective pixel detection circuit 203. In the second video signal processing circuit 103, defective pixel detection is performed on the lower region of the image by the first defective pixel detection circuit 203. The second embodiment is different from the above-described first embodiment in that the region in which detection is performed in the first video signal processing circuit 102 is set to be larger than the region in which detection is performed in the second video signal processing circuit 103.

The relationship on the time axis between defective pixel detection processing performed in the first video signal processing circuit 102 and defective pixel detection processing performed in the second video signal processing circuit 103 will be described with reference to FIG. 11. The abscissa in FIG. 11 indicates the time axis, and a flow of the defective pixel detection processing in the first video signal processing circuit 102 is shown in the upper portion of the figure, and a flow of the defective pixel detection processing in the second video signal processing circuit 103 is shown in the lower portion of the figure.

The defective pixel detection (step S102 in FIG. 8A) in the first video signal processing circuit 102 starts at T10', and ends at T11'. The defective pixel data transfer (step S103 in FIG. 8A) from the first video signal processing circuit 102 to the second video signal processing circuit 103 starts at T11' and ends at T12'.

Next, in the first video signal processing circuit 102, the merging (step S106 in FIG. 8A) of the defective pixel data (upper portion) and the defective pixel data (lower portion) starts at T13' and ends at T14'. In the first video signal processing circuit 102, defective pixel correction then starts using the defective pixel data (entire region) at T15'.

Meanwhile, the defective pixel detection (step S202 in FIG. 8B) in the second video signal processing circuit 103 starts at T20' and ends at T21'. The defective pixel data transfer (step S203 in FIG. 8B) from the second video signal processing circuit 103 to the first video signal processing circuit 102 starts at T21' and ends at T22'.

Next, in the second video signal processing circuit 103, the merging (step S206 in FIG. 8B) of the defective pixel data (upper portion) and the defective pixel data (lower portion) starts at T23' and ends at T24'. In the second video signal processing circuit 103, defective pixel correction then starts at T25' using the defective pixel data (entire region).

As shown in FIG. 11, the merging (step S106 in FIG. 8A) of the defective pixel data in the first video signal processing circuit 102 starts at a timing when the transfer (step S203 in FIG. 8B) of the defective pixel data from the second video signal processing circuit 103 ends, and thus T13'=T22'.

Moreover, the merging (step S206 in FIG. 8B) of the defective pixel data in the second video signal processing circuit 103 starts at a timing when the transfer (step S103 in FIG. 8A) of the defective pixel data from the first video signal processing circuit 102 ends, and thus T23'=T12'.

In addition, as shown in FIG. 10, the region to be processed in the first video signal processing circuit 102 is larger than the region to be processed in the second video signal processing circuit 103, thus a time required for detection and transfer is longer in the first video signal processing circuit 102, and the following relationships hold true.

$$T11'-T10'>T21'-T20'$$

$$T12'-T11'>T22'-T21'$$

$$T14'-T13'=T24'-T23'$$

Here, it is assumed that in the first video signal processing circuit 102, a time (T11'−T10') required for the detection is 2.2 VD, a time (T12'−T11') required for the transfer is 1.7 VD, and a time (T14'−T13') required for the merging is 1.2 VD. Next, it is assumed that in the second video signal processing circuit 103, a time (T21'−T20') required for the detection is 1.8 VD, a time (T22'−T21') required for the transfer is 1.3 VD, and a time (T24'−T23') required for the merging is 1.2 VD. At this time, a timing (T15') when defective pixel correction can be started is, in the first video signal processing circuit 102, 5 VD after the processing starts (T10'), and in the second video signal processing circuit 103, 5.5 VD. In terms of frame number, correction can be performed from the 11th frame.

As described above, by dividing a region in which detection is to be performed in each circuit by an appropriate ratio in accordance with the processing timing, and performing defective pixel detection, it becomes possible to reduce the time for defective pixel detection as an entire system.

The time for each process shown in FIG. 11 is merely an example, and the time required for the processing is not limited to the time shown in the example.

In addition, in the second embodiment, processing is divided between two circuits, but the processing may be divided between two or more circuits. Even in the case of using two or more circuits, by taking consideration of the delay time of each of the circuits, and appropriately dividing the detection region, it becomes possible to reduce the processing time compared with a conventional method.

Although the present invention have been described above in detail based on preferred embodiments, but the present invention is not limited to these specific embodiments, and various modifications within the scope of the principles of the present invention are included in the present invention. The above-described first and second embodiments can be partially combined as appropriate.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-178877, filed on Sep. 10, 2015 which is hereby incorporated by reference herein in its entirety.

What is claimed is:

1. An image capturing apparatus comprising:
an image sensor which has a plurality of pixels;
a first processing circuit having a first detection circuit and a first memory; and
a second processing circuit having a second detection circuit and a second memory,
wherein the first processing circuit and the second processing circuit perform defective pixel correction on different frames of images output from the image sensor,
the first detection circuit of the first processing circuit performs the defective pixel detection by determining whether or not a first target pixel in a first region of a first frame is a defective pixel on the basis of a value of an adjacent pixel of the first target pixel,
the second detection circuit of the second processing circuit performs the defective pixel detection by determining whether or not a second target pixel in a second region, different from the first region, of a second frame, different from the first frame, is a defective pixel on the basis of a value of an adjacent pixel of the second target pixel,
the first memory of the first processing circuit stores information on a defective pixel in the first region of the first frame detected by the first detection circuit and information on a defective pixel in the second region of the second frame detected by and transmitted from the second detection circuit,
the second memory of the second processing circuit stores information on the defective pixel in the second region of the second frame detected by the second detection circuit and information on the defective pixel in the first region of the first frame detected by and transferred from the first detection circuit, and
the first processing circuit performs the defective pixel correction using the information on a defective pixel stored in the first memory and the second processing circuit performs the defective pixel correction using the information on the defective pixel stored in the second memory.

2. The image capturing apparatus according to claim 1, wherein the first detection circuit and the second detection circuit perform defective pixel detection using an image obtained by shielding the image sensor from light or an image obtained by irradiating the image sensor with illumination light having a uniform luminance level.

3. The image capturing apparatus according to claim 1, wherein
the first region is an upper region obtained by vertically dividing the region of the plurality of pixels into two, and second region is a lower region.

4. The image capturing apparatus according to claim 3, wherein
the upper region and the lower region have the same size.

5. The image capturing apparatus according to claim 3, wherein
the upper region and the lower region have different sizes in accordance with a delay time of processing performed by each circuit.

6. The image capturing apparatus according to claim 1, wherein
the first processing circuit further includes a third detection circuit which performs defective pixel detection by a method different from the first detection circuit, and corrects the image output from the image sensor, further using information on defective pixels detected by the third detection circuit, and
the second processing circuit further includes a fourth detection circuit which performs defective pixel detection by a method different from the second detection circuit, and corrects the image output from the image sensor, further using information on defective pixels detected by the fourth detection circuit.

7. A control method for an image capturing apparatus including an image sensor which has a plurality of pixel, a first processing circuit having a first detection circuit and a first memory, and a second processing circuit having a second detection circuit and a second memory, the method comprising:
performing, in the first detection circuit of the first processing circuit, defective pixel detection by determining whether or not a first target pixel in a first region of a first frame is a defective pixel on the basis of a value of an adjacent pixel of the first target pixel;
performing, in the second detection circuit of the second processing circuit, defective pixel detection by determining whether or not a second target pixel in a second region, different from the first region, of a second frame, different from the first frame, is a defective pixels on the basis of a value of an adjacent pixel of the second target pixel;

storing, in the first memory of the first processing circuit, information on a defective pixel in the first region of the first frame detected by the first detection circuit and information on a defective pixel in the second region of the second frame detected by and transmitted from the second detection circuit;

storing, in the second memory of the second processing circuit, information on the defective pixel in the second region of the second frame detected by the second detection circuit and information on the defective pixel in the first region of the first frame detected by and transferred from the first detection circuit;

performing the defective pixel correction by the first processing circuit using the information on a defective pixel stored in the first memory; and performing the defective pixel correction by the second processing circuit using the information on a defective pixel stored in the second memory, wherein the first processing circuit and the second processing circuit perform defective pixel correction on different frames of images output from the image sensor.

8. A non-transitory computer-readable storage medium which stores a program or causing a computer provided in an image capturing apparatus including an image sensor which has a plurality of pixels, to function as a first processing circuit having a first detection circuit and a first memory; and a second processing circuit having a second detection circuit and a second memory, wherein the first processing circuit and the second processing circuit perform defective pixel correction on different frames of images output from the image sensor, the first detection circuit of the first processing circuit performs the defective pixel detection by determining whether or not a first target pixel in a first region first frame is a defective pixel on the basis of a value of an adjacent pixel of the first target pixel, the second detection circuit of the second processing circuit performs the defective pixel detection by determining whether or not a second target pixel in a second region, different from the first region, of a second frame, different from the first frame, is a defective pixel on the basis of a value of an adjacent pixel of the second target pixel, the first memory of the first processing circuit stores information on a defective pixel in the first region of the first frame detected by the first detection circuit and information on a defective pixel in the second region of the second frame detected by and transmitted from the second detection circuit, the second memory of the second processing circuit stores information on the defective pixel in the second region of the second frame detected by the second detection circuit and information on the defective pixel in the first region of the first frame detected by and transferred from the first detection circuit, and the first processing circuit perform the defective pixel correction using the information on a defective pixel stored in the first memory and the second processing circuit performs the defective pixel correction using the information on the defective pixel stored in the second memory.

* * * * *